(12) United States Patent  (10) Patent No.: US 12,304,275 B2
Kang et al.  (45) Date of Patent: May 20, 2025

(54) VEHICULAR AIR CONDITIONING SYSTEM

(71) Applicant: Hanon Systems, Daejeon (KR)

(72) Inventors: In Keun Kang, Daejeon (KR); Sang Ho Oh, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 10 days.

(21) Appl. No.: 18/274,006

(22) PCT Filed: Feb. 25, 2022

(86) PCT No.: PCT/KR2022/002770
§ 371 (c)(1),
(2) Date: Jul. 25, 2023

(87) PCT Pub. No.: WO2022/186552
PCT Pub. Date: Sep. 9, 2022

(65) Prior Publication Data
US 2024/0424860 A1  Dec. 26, 2024

(30) Foreign Application Priority Data
Mar. 4, 2021 (KR) .................. 10-2021-0028738

(51) Int. Cl.
*B60H 1/00* (2006.01)
*B60H 1/22* (2006.01)
(52) U.S. Cl.
CPC ....... *B60H 1/00521* (2013.01); *B60H 1/2225* (2013.01); *B60H 2001/00635* (2013.01)
(58) Field of Classification Search
CPC ............. B60H 1/00521; B60H 1/2225; B60H 2001/00635; B60H 1/04; B60H 2001/00128; F24H 3/0435
(Continued)

(56) References Cited

U.S. PATENT DOCUMENTS 4,134,275 A * 1/1979 Erickson ............ B60H 1/00535
62/243
4,885,916 A * 12/1989 Arndt .................. B60H 1/3227
62/244
(Continued)

FOREIGN PATENT DOCUMENTS

JP  4078180 B2  4/2008
JP  2014213671 A  11/2014
(Continued)

OTHER PUBLICATIONS

International Search Report issued in PCT/KR2022/002770 on Jun. 13, 2022.

*Primary Examiner* — Jon T. Schermerhorn, Jr.
(74) *Attorney, Agent, or Firm* — NORTON ROSE FULBRIGHT US LLP

(57) ABSTRACT

The present invention provides a vehicular air conditioning system capable of improving the heat exchange rate of a heat exchanger by increasing the heating region of the heat exchanger, and preventing air communication between the left and right flow paths on both sides of a separation plate by securing airtightness between the heat exchanger and the separation plate.
The vehicular air conditioning system includes: an air conditioning case; a heat exchanger installed inside the air conditioning case; a separation plate configured to divide the inside of the air conditioning case into a plurality of flow paths and partition the heat exchanger into parts corresponding to the divided flow paths; and a coupling part configured to airtightly combine the separation plate and the heat exchanger to prevent air communication between the flow paths through a gap between the separation plate and the heat exchanger.

12 Claims, 11 Drawing Sheets

(58) Field of Classification Search
USPC .......................................................... 165/42
See application file for complete search history.

(56) References Cited

U.S. PATENT DOCUMENTS

| | | | |
|---|---|---|---|
| 6,749,008 B2* | 6/2004 | Kawauchi .......... | B60H 1/00564 |
| | | | 237/12.3 B |
| 9,238,396 B2* | 1/2016 | Uto .................... | B60H 1/00371 |
| 9,937,768 B2* | 4/2018 | Sakakibara ........ | B60H 1/00564 |
| 2006/0060341 A1* | 3/2006 | Maehata ............ | B60H 1/00671 |
| | | | 165/42 |

FOREIGN PATENT DOCUMENTS

| KR | 20080076216 A | 8/2008 |
|---|---|---|
| KR | 20150011635 A | 2/2015 |
| KR | 20150093436 A | 8/2015 |

* cited by examiner

VEHICULAR AIR CONDITIONING SYSTEM

CROSS REFERENCE TO RELATED APPLICATIONS

This patent application is a national phase under 35 U.S.C. § 371 of International Patent Application No. PCT/KR2022/002770 filed Feb. 25, 2022, which claims the benefit of priority from Korean Patent Application No. 10-2021-0028738 filed Mar. 4, 2021, each of which is hereby incorporated herein by reference in its entirety for all purposes.

TECHNICAL FIELD

The present invention relates to a vehicular air conditioning system, and more particularly, a vehicular air conditioning system in which the sealing structure between a heat exchanger and a separation plate that divides the inside of an air conditioning case into a plurality of flow paths is improved to thereby increase the heat generation area of the heat exchanger and improve the heat exchange efficiency of the heat exchanger, and airtightness is secured between the heat exchanger and the separation plate to thereby prevent air leakage between the flow paths.

BACKGROUND ART

Recent air conditioning systems have been developed as individual air conditioning structures that independently cool and heat a plurality of regions in a vehicle interior. As an example, there is a dual zone type air conditioning system that independently cools and heats the left and right parts of the vehicle interior.

In this technique, as shown in FIG. 1, the inside of the air conditioning case 10 is divided into a left flow path 14 and a right flow path 16 by installing a separation plate 12 inside the air conditioning case 10.

In addition, temperature doors 20 and 30 are separately installed in the divided left and right flow paths 14 and 16. The left and right temperature doors 20 and 30 are individually controlled to individually adjust the flow rates of cold or hot air in the left and right flow paths 14 and 16.

In particular, by individually controlling the left and right temperature doors 20 and 30, the flow rates of air passing through the cooling-purpose heat exchanger 40 and the heating-purpose heat exchanger 50 are differently controlled for the left and right flow paths 14 and 16, thereby independently controlling the flow rates of the cold air or the hot air blown along the left and right flow paths 14 and 16, respectively.

Therefore, the cold air or the hot air in the left and right flow paths 14 and 16 whose flow rate is independently controlled is independently supplied to the left and right parts of the vehicle interior to independently cool or heat the left and right parts of the vehicle interior.

Meanwhile, the heating-purpose heat exchanger 50 installed in the left and right flow paths 14 and 16 of the air conditioning case 10 is composed of a heater core through which engine cooling water circulates or a PTC heater (Positive Temperature Coefficient Heater).

Recently, in accordance with the increasing trend of hybrid vehicles or electric vehicles, the heating-purpose heat exchanger 50 is configured as a PTC heater.

In the case of the PTC heater, the left part 50a corresponding to the left flow path 14 and the right part 50b corresponding to the right flow path 16 may be independently temperature-controlled. Therefore, the temperatures of the air blown along the left flow path 14 and the right flow path 16 can be independently controlled.

Typically, as shown in FIG. 2, the heating-purpose heat exchanger 50 is inserted into the air conditioning case 10 through a side opening 10a formed on one side of the air conditioning case 10. Then, by pushing and sliding the heating-purpose heat exchanger 50 toward the other side, the heating-purpose heat exchanger 50 passes through a through-hole 12a of the separation plate 12 and is assembled so as to cross the left and right flow paths 14 and 16 of the air conditioning case 10.

Meanwhile, a sealing member 12b is installed between the heating-purpose heat exchanger 50 and the separation plate 12 of the air conditioning case 10. The sealing member 12b airtightly seals a gap between the heating-purpose heat exchanger 50 and the separation plate 12 to prevent air communication between the left flow path 14 and the right flow path 16 air on both sides of the separation plate 12.

The sealing member 12b is made of a soft material such as polyurethane or synthetic rubber, and is installed around the outer surface of the heating-purpose heat exchanger 50. When assembling the heating-purpose heat exchanger 50, the sealing member 12b is arranged between the separation plate 12 and the heating-purpose heat exchanger 50.

However, since such a conventional air conditioning system has a structure in which the sealing member 12b for sealing a gap between the heating-purpose heat exchanger 50 and the separation plate 12 is installed around the outer surface of the heating-purpose heat exchanger 50, the heating region of the heating-purpose heat exchanger 50 is narrowed as much as the width W of the sealing member 12b.

For this reason, the heat exchange rate between the heating-purpose heat exchanger 50 and the airs in the left and right flow paths 14 and 16 is lowered, and as a result, the heating efficiency in the vehicle interior is lowered.

In addition, the sealing member 12b is installed on the outer surface of the heating-purpose heat exchanger 50 and is assembled into the air conditioning case 10 together with the heating-purpose heat exchanger 50 so that the sealing member 12b is arranged between the separation plate 12 and the heating-purpose heat exchanger 50. In this assembly process, the sealing member 12b may not be accurately arranged between the separation plate 12 and the heating-purpose heat exchanger 50.

In particular, when the heating-purpose heat exchanger 50 is assembled by pushing it into the air conditioning case 10, the sealing member 12b is deformed while interfering with the separation plate 12. Therefore, the sealing member 12b is not accurately arranged between the separation plate 12 and the heating-purpose heat exchanger 50, resulting in poor assembly.

Thus, the airtightness between the separation plate 12 and the heating-purpose heat exchanger 50 is deteriorated, and the left and right flow paths 14 and 16 may be in air communication with each other.

In addition, since the sealing member 12b is made of a material vulnerable to heat and installed on the outer surface of the heating-purpose heat exchanger 50, the sealing member 12b may be thermally deformed when continuously exposed to the heat of the heating-purpose heat exchanger 50.

Therefore, the airtightness between the separation plate 12 and the heating-purpose heat exchanger 50 is deteriorated, and as a result, the left and right flow paths 14 and 16 may be air communication with each other.

SUMMARY

In view of the problems inherent in the related art, it is an object of the present invention to provide a vehicular air conditioning system capable of securing the airtightness between a heat exchanger and a separation plate while minimizing the covering area for the heat exchanger.

Another object of the present invention is to provide a vehicular air conditioning system capable of improving the heat exchange rate of a heat exchanger by increasing the heating region of the heat exchanger, and preventing air communication between the left and right flow paths on both sides of a separation plate by securing airtightness between the heat exchanger and the separation plate.

A further object of the present invention is to provide a vehicular air conditioning system capable of airtightly sealing a gap between a heat exchanger and a separation plate without worrying about assembly failure, thereby fundamentally preventing air communication between the left and right flow paths on both sides of the separation plate.

A still further object of the present invention is to provide a vehicular air conditioning system capable of airtightly sealing a gap between a heat exchanger and a separation plate without worrying about thermal damage and thermal deformation, thereby fundamentally preventing air communication between the left and right flow paths on both sides of the separation plate.

In order to achieve these objects, there is provided a vehicular air conditioning system, including: an air conditioning case; a heat exchanger installed inside the air conditioning case; a separation plate configured to divide the inside of the air conditioning case into a plurality of flow paths and partition the heat exchanger into parts corresponding to the divided flow paths; and a coupling part configured to airtightly combine the separation plate and the heat exchanger to prevent air communication between the flow paths through a gap between the separation plate and the heat exchanger.

The coupling part may include a groove formed on one side of the separation plate and the heat exchanger, and a tongue member installed on the other side of the separation plate and the heat exchanger and coupled to the groove, and the groove and the tongue member may be coupled to each other to airtightly seal a gap between the separation plate and the heat exchanger.

The heat exchanger may be assembled into the air conditioning case by being inserted through a side opening of the air conditioning case and then pushed and slid toward the inside of the air conditioning case, and the groove and the tongue member of the coupling part may be formed along an assembly direction of the heat exchanger and coupled to each other in a process of assembling the heat exchanger into the air conditioning case.

The separation plate may include a transverse separation plate configured to divide the inside of the air conditioning case into a left flow path and a right flow path and partition the heat exchanger into a left part and a right part to correspond to the left flow path and the right flow path, and the coupling part may be configured to prevent air communication between the left flow path and the right flow path through the gap between the transverse separation plate and the heat exchanger.

The transverse separation plate may have a through-hole extending from the side opening of the air conditioning case toward the assembly direction of the heat exchanger, the heat exchanger may be inserted into the side opening of the air conditioning case and then assembled into the left flow path and the right flow path through the through-hole of the transverse separation plate, and the coupling part may be configured to airtightly couple the through-hole of the transverse separation plate and the heat exchanger to prevent air communication between the left flow path and the right flow path through a gap between the through-hole and the heat exchanger.

The coupling part may include a groove formed around the through-hole of the transverse separation plate on the side of the side opening, and a tongue member mounted on the heat exchanger to correspond to the groove of the transverse separation plate, and the groove and the tongue member may be coupled to each other in a process of assembling the heat exchanger into the air conditioning case through the side opening and configured to airtightly seal the gap between the through-hole of the transverse separation plate and the heat exchanger.

The tongue member may include a pair of tongue members mounted on an outer surface of the heat exchanger corresponding to the groove of the transverse separation plate and arranged on both sides of the heat exchanger to face each other with the heat exchanger interposed therebetween.

The separation plate may include a vertical separation plate configured to divide the inside of the air conditioning case into an upper flow path and a lower flow path and partition the heat exchanger into an upper part and a lower part corresponding to the upper flow path and the lower flow path, and the coupling part may be configured to prevent air communication between the upper flow path and the lower flow path through a gap between the vertical separation plate and the heat exchanger.

The vertical separation plate may have a cutout cut from the side opening of the air conditioning case along the assembly direction of the heat exchanger, the heat exchanger may be inserted into the side opening of the air conditioning case and then assembled toward the upper flow path and the lower flow path through the cutout of the vertical separation plate, and the coupling part may be configured to airtightly couple the cutout of the vertical separation plate and the heat exchanger to prevent air communication between the upper flow path and the lower flow path through a gap between the cutout and the heat exchanger.

The coupling part may include grooves formed along both sides of the cutout of the vertical separation plate on the side of the side opening, and tongue members mounted on the heat exchanger so as to correspond to the grooves of the vertical separation plate, and the grooves and the tongue members may be coupled to each other in a process of assembling the heat exchanger into the air conditioning case through the side opening and configured to airtightly seal the gap between the cutout of the vertical separation plate and the heat exchanger.

According to the vehicular air conditioning system of the present invention, the gap between the heat exchanger and the separation plate is sealed by using the coupling structure of the tongue and the groove. Therefore, unlike the prior art using a soft sealing member, it is possible to minimize the covering of the heating region of the heat exchanger and to secure airtightness between the heat exchanger and the separation plate.

In addition, since it is possible to minimize the covering of the heating region of the heat exchanger and to secure airtightness between the heat exchanger and the separation plate, the heat exchange rate of the heat exchanger can be improved by minimizing the covering of the heating region of the heat exchanger, and the air communication between the left and right flow paths can be prevented by securing the airtightness between the heat exchanger and the separation plate.

In addition, the coupling structure of the tongue and the groove is used to seal the gap between the heat exchanger and the separation plate, and the tongue and the groove are smoothly assembled during the assembly process of the heat exchanger. Therefore, unlike the prior art, it is possible to effectively seal the gap between the heat exchanger and the separation plate without worrying about the deformation of the sealing member and the resultant assembly failure.

In addition, the gap between the heat exchanger and the separation plate is sealed by using the coupling structure of the heat-resistant tongue and the groove. Therefore, unlike the prior art using a soft sealing member, the gap between the heat exchanger and the separation plate can be airtightly sealed without worrying about the thermal damage and the thermal deformation.

DETAILED DESCRIPTION

Preferred embodiments of a vehicular air conditioning system according to the present invention will now be described in detail with reference to the accompanying drawings.

Figure 1:
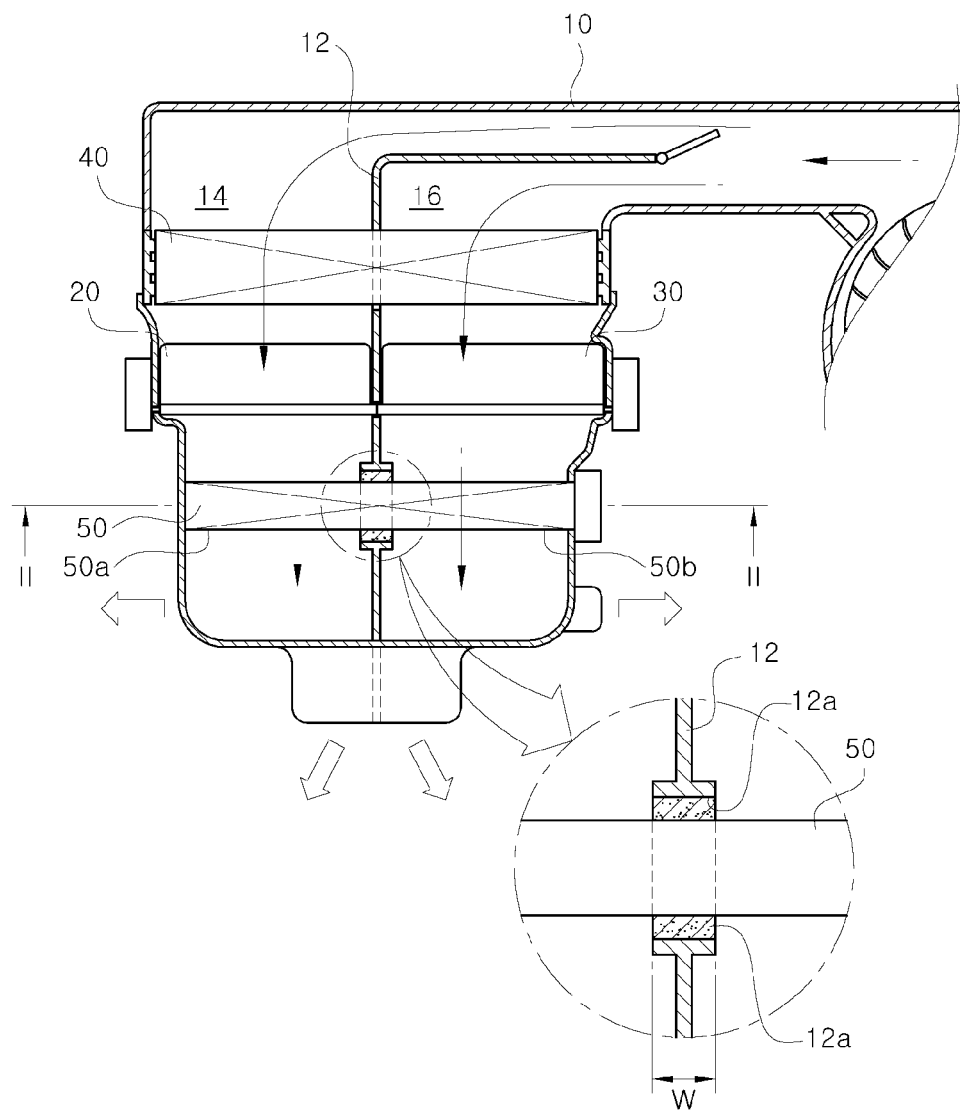
FIG. 1 is a view showing the configuration of a conventional vehicular air conditioning system.
Figure 2:
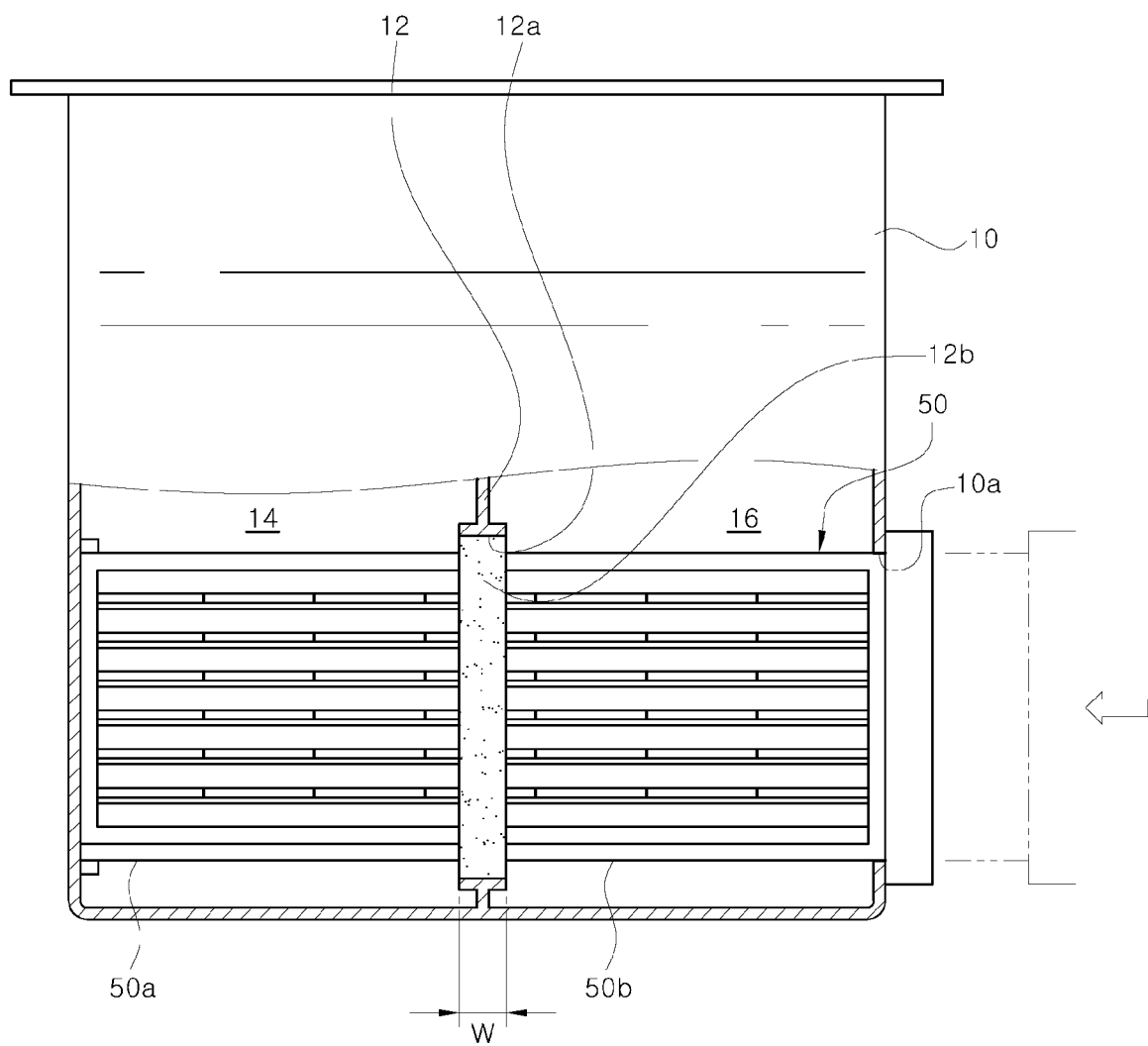
FIG. 2 is a cross-sectional view taken along line II-II in FIG. 1, showing the configuration of the conventional vehicular air conditioning system.

Prior to describing the features of the vehicular air conditioning system according to the present invention, a dual zone type air conditioning system will be briefly described with reference to FIGS. 1 and 3.

In a dual zone type air conditioning system, the inside of an air conditioning case 10 is divided into a left flow path 14 and a right flow path 16 by installing a separation plate 12 inside the air conditioning case 10. Temperature doors 20 and 30 are separately installed in the divided left and right flow paths 14 and 16.

The left and right temperature doors 20 and 30 are individually controlled to individually adjust the flow rates of cold or hot air in the left and right flow paths 14 and 16.

In particular, by individually controlling the left and right temperature doors 20 and 30, the flow rates of air passing through the cooling-purpose heat exchanger 40 and the heating-purpose heat exchanger 50 are differently controlled for the left and right flow paths 14 and 16, thereby independently controlling the flow rates of the cold air or the hot air blown along the left and right flow paths 14 and 16, respectively.

In this regard, the heating-purpose heat exchanger 50 installed in the left and right flow paths 14 and 16 of the air conditioning case 10 is composed of a heater core through which engine cooling water circulates or a PTC heater (Positive Temperature Coefficient Heater).

Recently, in accordance with the increasing trend of hybrid vehicles or electric vehicles, the heating-purpose heat exchanger 50 is configured as a PTC heater. Hereinafter, the PTC heater is described as an example of the heating-purpose heat exchanger 50.

Typically, the PTC heater 50 is inserted into the air conditioning case 10 through a side opening 10a formed on one side of the air conditioning case 10. Then, by pushing and sliding the PTC heater 50 toward the other side, the PTC heater 50 passes through a through-hole 12a of the separation plate 12 and is assembled so as to cross the left and right flow paths 14 and 16 of the air conditioning case 10.

Next, features of the vehicular air conditioning systems according to embodiments of the present invention will be described in detail with reference to FIGS. 3 to 11.

Referring first to FIGS. 3 to 6, the vehicular air conditioning system according to one embodiment of the present invention includes a coupling part 60 that airtightly seals a gap between the PTC heater 50 and the separation plate 12 in the air conditioning case 10.

The coupling part 60 includes a groove 62 formed along the peripheral portion of the through-hole 12a of the separation plate 12, and a tongue member 64 installed on the PTC heater 50 so as to correspond to the groove 62 of the separation plate 12.

The groove 62 is formed in the peripheral portion of the through-hole 12a of the separation plate 12 corresponding to the side opening 10a of the air conditioning case 10. The groove 62 thus formed is it is configured to face the PTC heater 50 assembled through the side opening 10a.

In this regard, the groove 62 is configured to be integrally formed during the injection molding process of the separation plate 12.

The tongue member 64 is made of a material having high heat resistance, for example, nylon. The tongue member 64 is manufactured separately and then mounted around the outer surface of the PTC heater 50.

In particular, the tongue member 64 is configured to be mounted on the outer circumferential portion of the PTC heater 50 corresponding to the through-hole 12a of the separation plate 12. The tongue member 64 configured in this way is arranged to face the circumference of the through-hole 12a of the separation plate 12 when the tongue member 64 and the PTC heater 50 are assembled into the air conditioning case 10 through the side opening 10a of the air conditioning case 10.

Meanwhile, the tongue member 64 has a tongue 64a protruding toward the through-hole 12a of the separation plate 12.

The tongue 64a is formed to correspond to the groove 62 formed around the through-hole 12a of the separation plate 12. In particular, the tongue 64a protrudes from the tongue member 64 to correspond to the groove 62, and protrudes in the assembly direction of the PTC heater 50.

As shown in FIGS. 5 to 8, when the PTC heater 50 is assembled into the air conditioning case 10, the tongue 64a is fitted and coupled to the groove 62 of the peripheral portion of the through-hole 12a of the separation plate 12.

Therefore, the tongue 64a is configured to airtightly seal the gap between the PTC heater 50 and the through-hole 12a of the separation plate 12. In particular, since the tongue 64a is fitted and coupled to the groove 62, it exhibits excellent airtightness.

As a result, air communication between the left flow path 14 and the right flow path 16 through the through-hole 12a of the separation plate 12 is fundamentally prevented.

In addition, since the tongue 64a is smoothly fitted and coupled to the groove 62 of the separation plate 12 during the assembly process of the PTC heater 50, unlike the conventional technique of sealing the gap between the PTC heater 50 and the separation plate 12 using a soft sealing member, it is possible for the tongue 64a to efficiently seal the gap between the PTC heater 50 and the separation plate 12 without worrying about deformation or assembly failure.

Therefore, air communication between the left and right flow paths 14 and 16 due to deformation or assembly failure can be fundamentally prevented.

In addition, since the tongue 64a is configured to seal the gap between the PTC heater 50 and the separation plate 12 while being fitted and coupled to the groove 62 of the separation plate 12, unlike the conventional technique of sealing the gap between the PTC heater 50 and the separation plate 12 using a soft sealing member, it is possible for the tongue 64a having a small width and a small size to efficiently seal the gap between the PTC heater 50 and the separation plate 12.

Therefore, it is possible to minimize the covering of the heating region of the PTC heater 50 and to secure airtightness between the PTC heater 50 and the separation plate 12.

As a result, the heat exchange rate of the PTC heater 50 can be improved by minimizing the covering of the heating region of the PTC heater 50, and the air communication between the left and right flow paths 14 and 16 can be prevented by securing the airtightness between the PTC heater 50 and the separation plate 12.

In addition, since the tongue 64a is made of a heat-resistant material, unlike the conventional technique of sealing the gap between the PTC heater 50 and the separation plate 12 using a soft sealing member, it is possible for the tongue 64a to efficiently seal the gap between the PTC heater 50 and the separation plate 12 without worrying about thermal damage or thermal deformation.

Therefore, air communication between the left and right flow paths 14 and 16 due to thermal damage or thermal deformation can be fundamentally prevented.

Meanwhile, a pair of tongue members 64 is mounted around the outer surface of the PTC heater 50. The tongue members 64 are mounted to face each other on both sides of the PTC heater 50 with the PTC heater 50 interposed therebetween.

In this case, the tongue members 64 are configured to be mounted to the PTC heater 50 by an adhesive or fastening screws.

Figure 3:
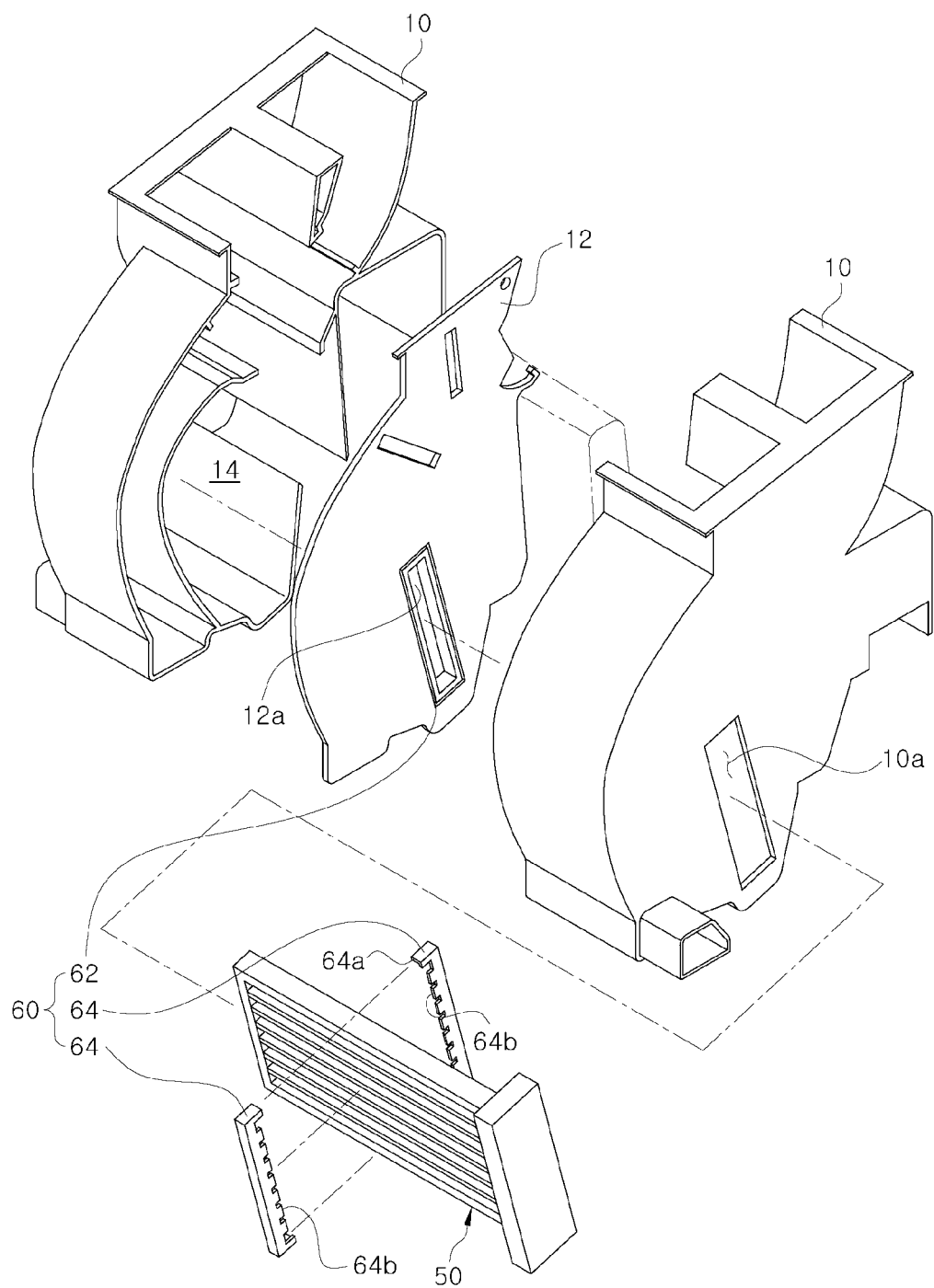
FIG. 3 is an exploded perspective view showing the configuration of a vehicular air conditioning system according to one embodiment of the present invention.
Figure 4:
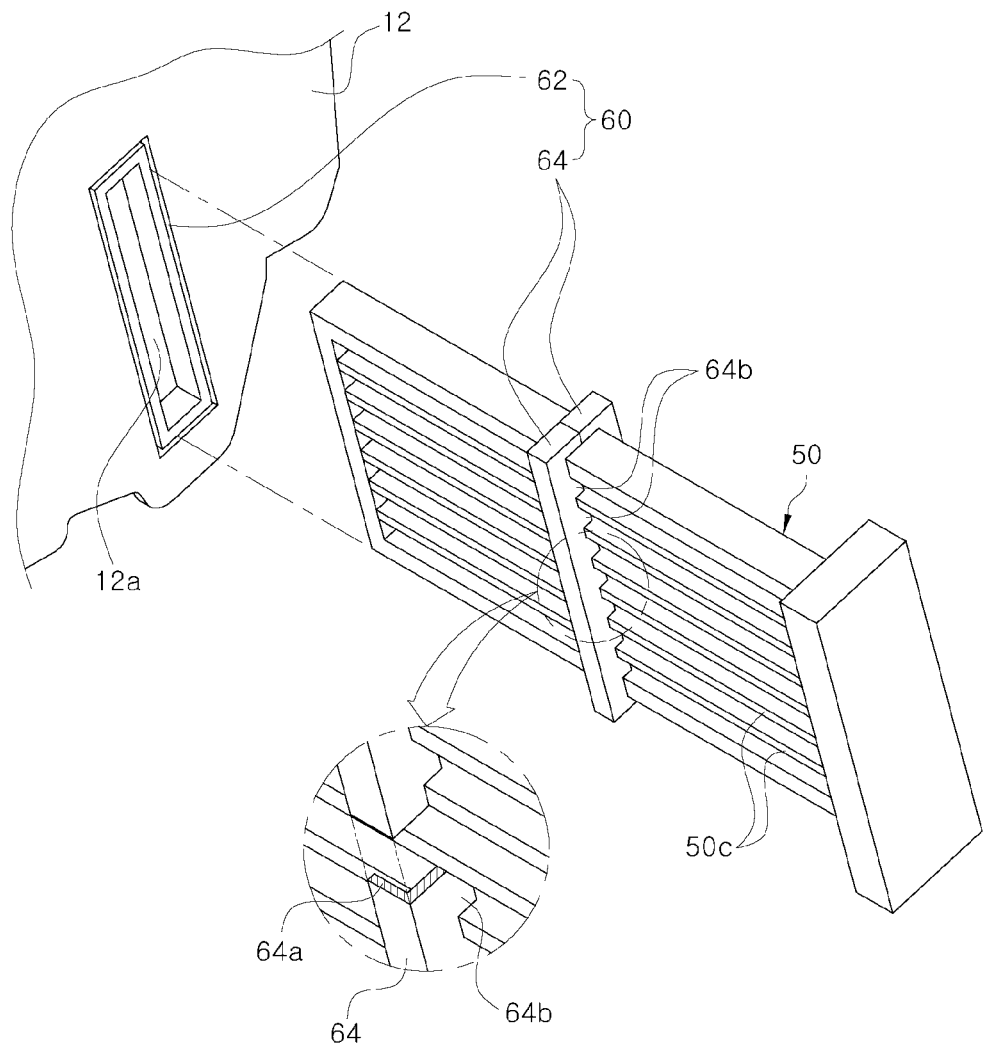
FIG. 4 is a perspective view showing a coupling part between a heat exchanger and a separation plate, which is a main feature of the vehicular air conditioning system according to the present invention.
Figure 5:
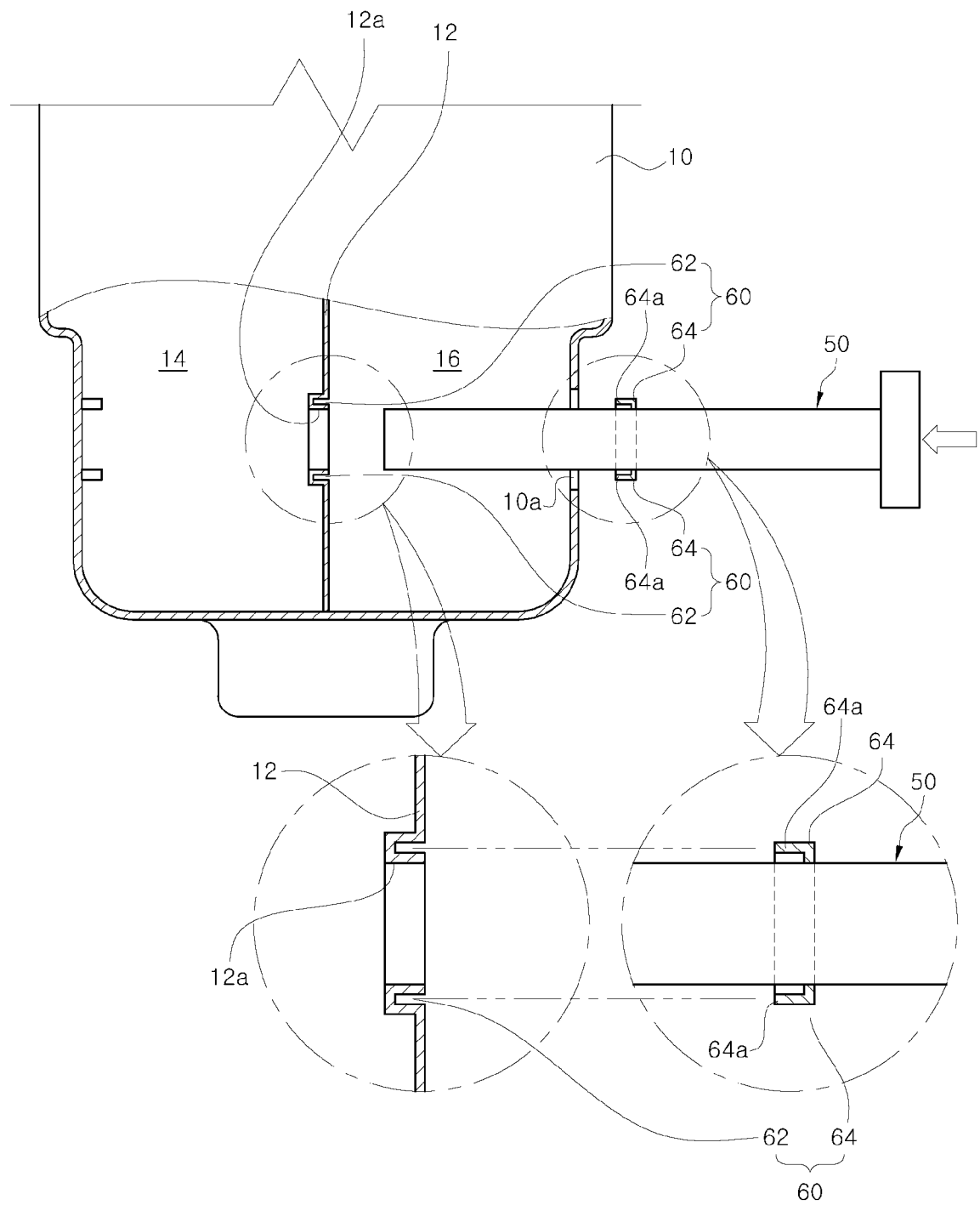
FIG. 5 is a cross-sectional plan view showing the coupling part between the heat exchanger and the separation plate, which is a main feature of the vehicular air conditioning system according to the present invention, in which view the heat exchanger is not assembled into an air conditioning case.
Figure 6:
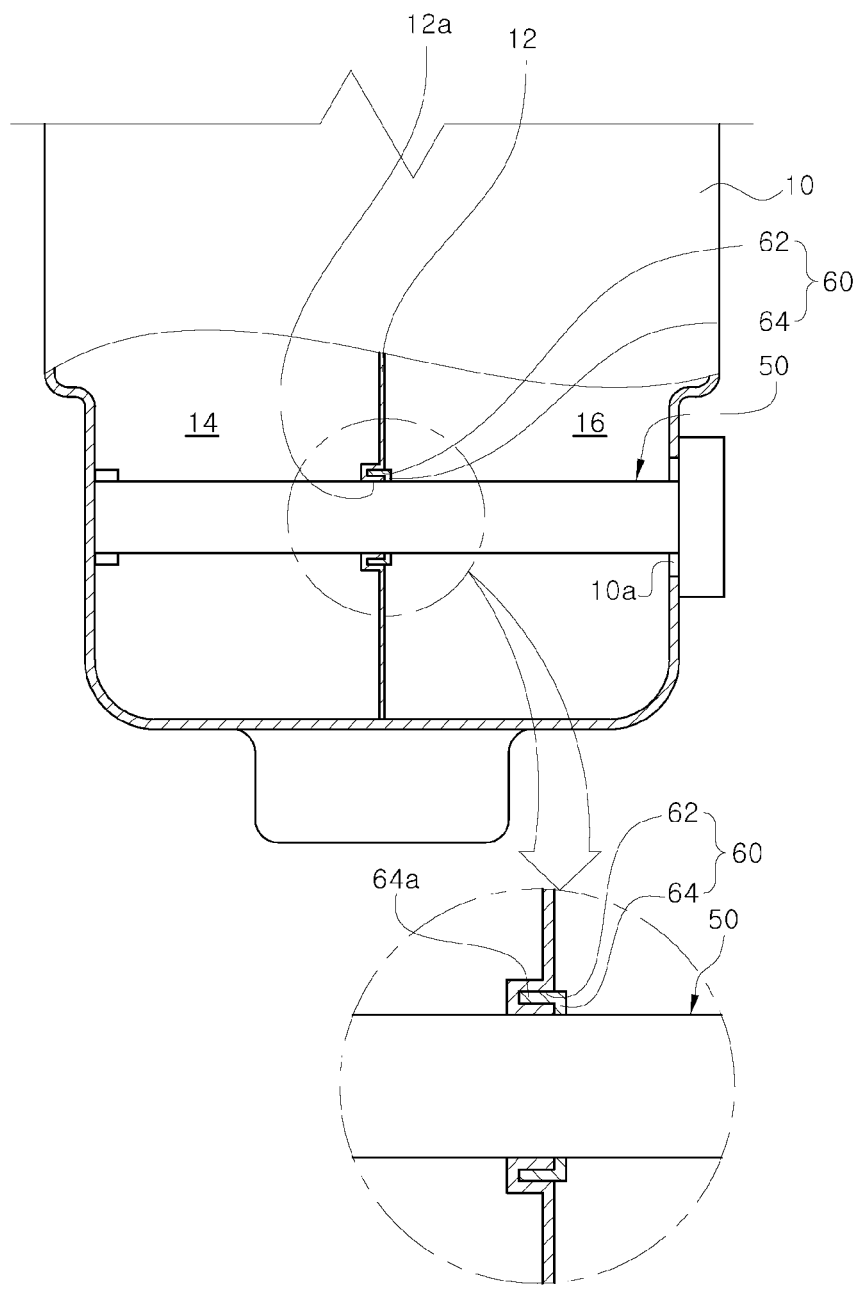
FIG. 6 is a cross-sectional plan view showing the coupling part between the heat exchanger and the separation plate, which is a main feature of the vehicular air conditioning system according to the present invention, in which view the heat exchanger is assembled into the air conditioning case.
Figure 7:
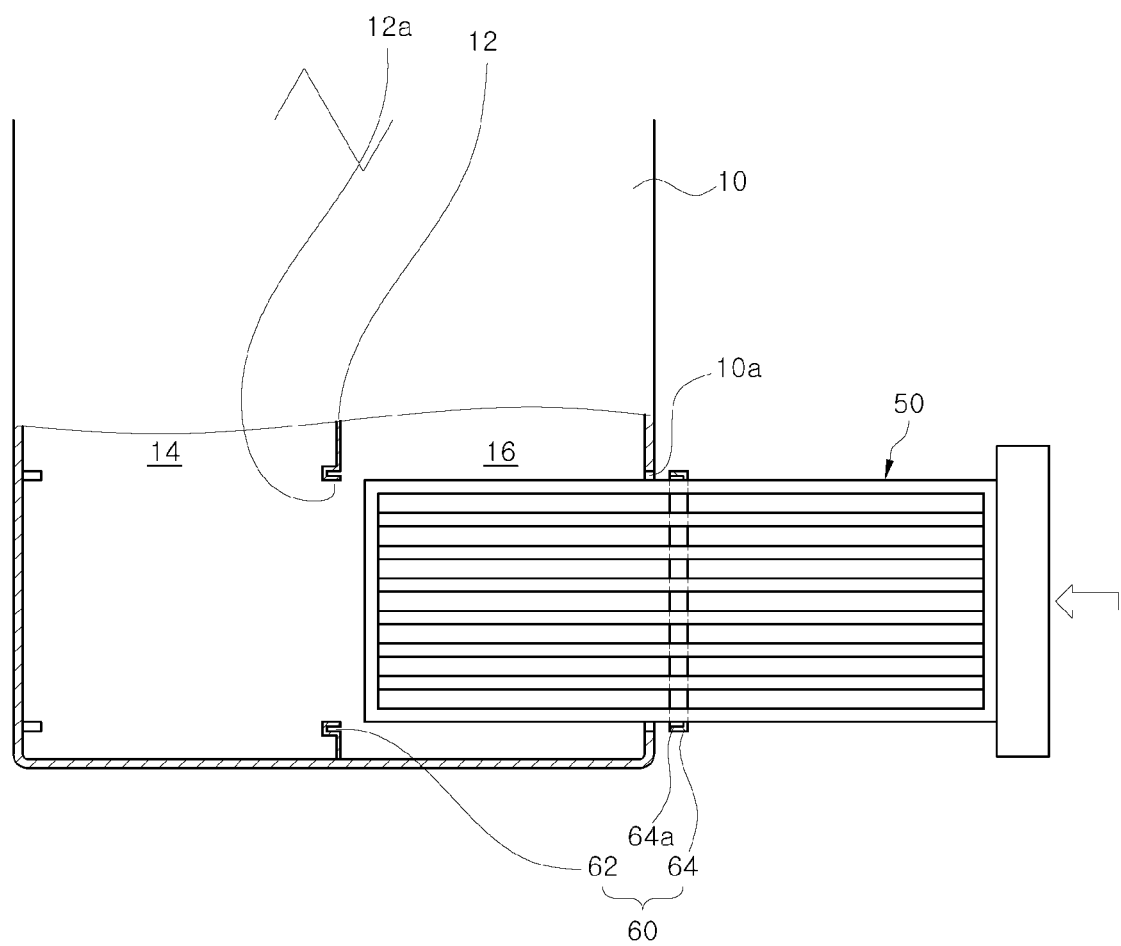
FIG. 7 is a rear cross-sectional view showing the coupling part between the heat exchanger and the separation plate, which is a main feature of the vehicular air conditioning system according to the present invention, in which view the heat exchanger is not assembled into the air conditioning case.
Figure 8:
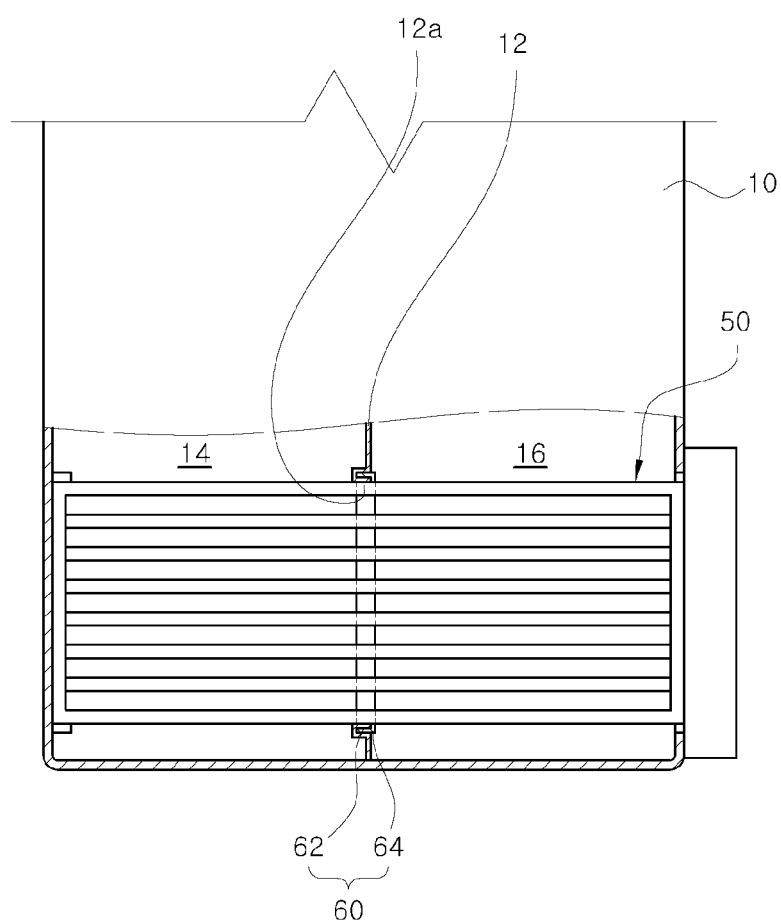
FIG. 8 is a rear cross-sectional view showing the coupling part between the heat exchanger and the separation plate, which is a main feature of the vehicular air conditioning system according to the present invention, in which view the heat exchanger is assembled into the air conditioning case.

In addition, as shown in FIGS. 3 and 4, the tongue members 64 includes a plurality of protrusions 64b protruding toward the gaps between the heating rods 50c of the PTC heater 50.

The protrusions 64b are formed at regular intervals along the vertical longitudinal direction of the tongue member 64. When the tongue member 64 is mounted on the PTC heater 50, the protrusions 64b are fitted and coupled to the gaps between the heating rods 50c of the PTC heater 50.

The protrusions 64b serve to increase the coupling force of the tongue member 64 with respect to the PTC heater 50.

According to the vehicular air conditioning system of the present invention having such a configuration, the gap between the PTC heater 50 and the separation plate 12 is sealed by using the coupling structure of the tongue member 64 and the groove 62. Therefore, unlike the conventional technique that uses a soft sealing member, it is possible to secure airtightness between the PTC heater 50 and the separation plate 12 while minimizing the covering of the heating region of the PTC heater 50.

In addition, since it is possible to minimize the covering of the heating region of the PTC heater 50 and to secure airtightness between the PTC heater 50 and the separation plate 12, the heat exchange rate of the PTC heater 50 can be improved by minimizing the covering of the heating region of the PTC heater 50, and the air communication between the left and right flow paths 14 and 15 can be prevented by securing the airtightness between the PTC heater 50 and the separation plate 12.

In addition, the coupling structure of the tongue member 64 and the groove 62 is used to seal the gap between the PTC heater 50 and the separation plate 12, and the tongue 64a and the groove 62 are smoothly assembled during the assembly process of the PTC heater 50. Therefore, unlike the prior art, it is possible to effectively seal the gap between the PTC heater 50 and the separation plate 12 without worrying about the deformation of the sealing member and the resultant assembly failure.

In addition, the gap between the PTC heater 50 and the separation plate 12 is sealed by using the coupling structure of the heat-resistant tongue 64a and the groove 62. Therefore, unlike the prior art using a soft sealing member, the gap between the PTC heater 50 and the separation plate 12 can be airtightly sealed without worrying about the thermal damage and the thermal deformation.

Figure 9:
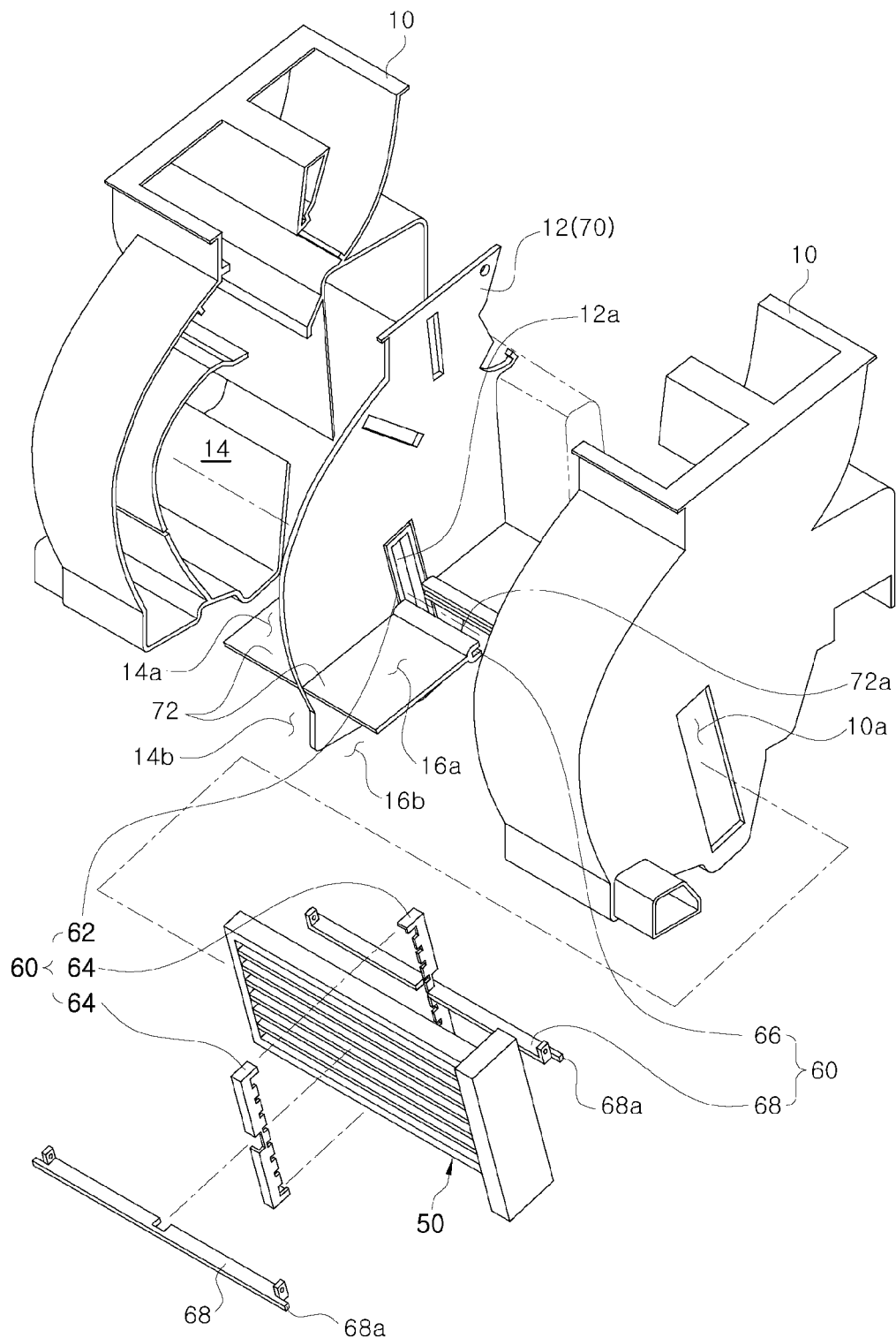
FIG. 9 is an exploded perspective view showing the configuration of a vehicular air conditioning system according to another embodiment of the present invention.
Figure 10:
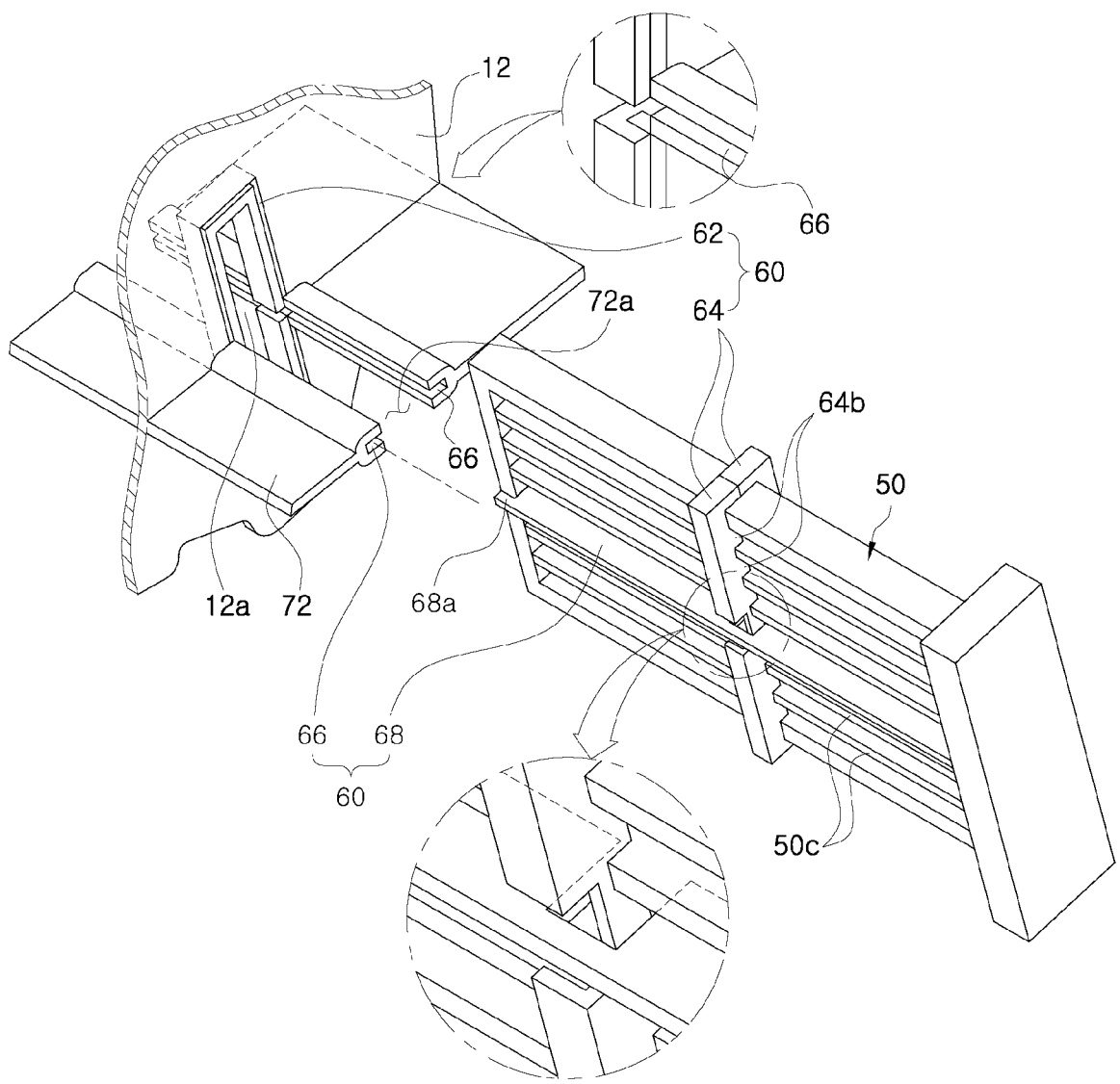
FIG. 10 is a perspective view showing a coupling part between a heat exchanger and a separation plate, which is a main feature of the vehicular air conditioning system according to another embodiment of the present invention.
Figure 11:
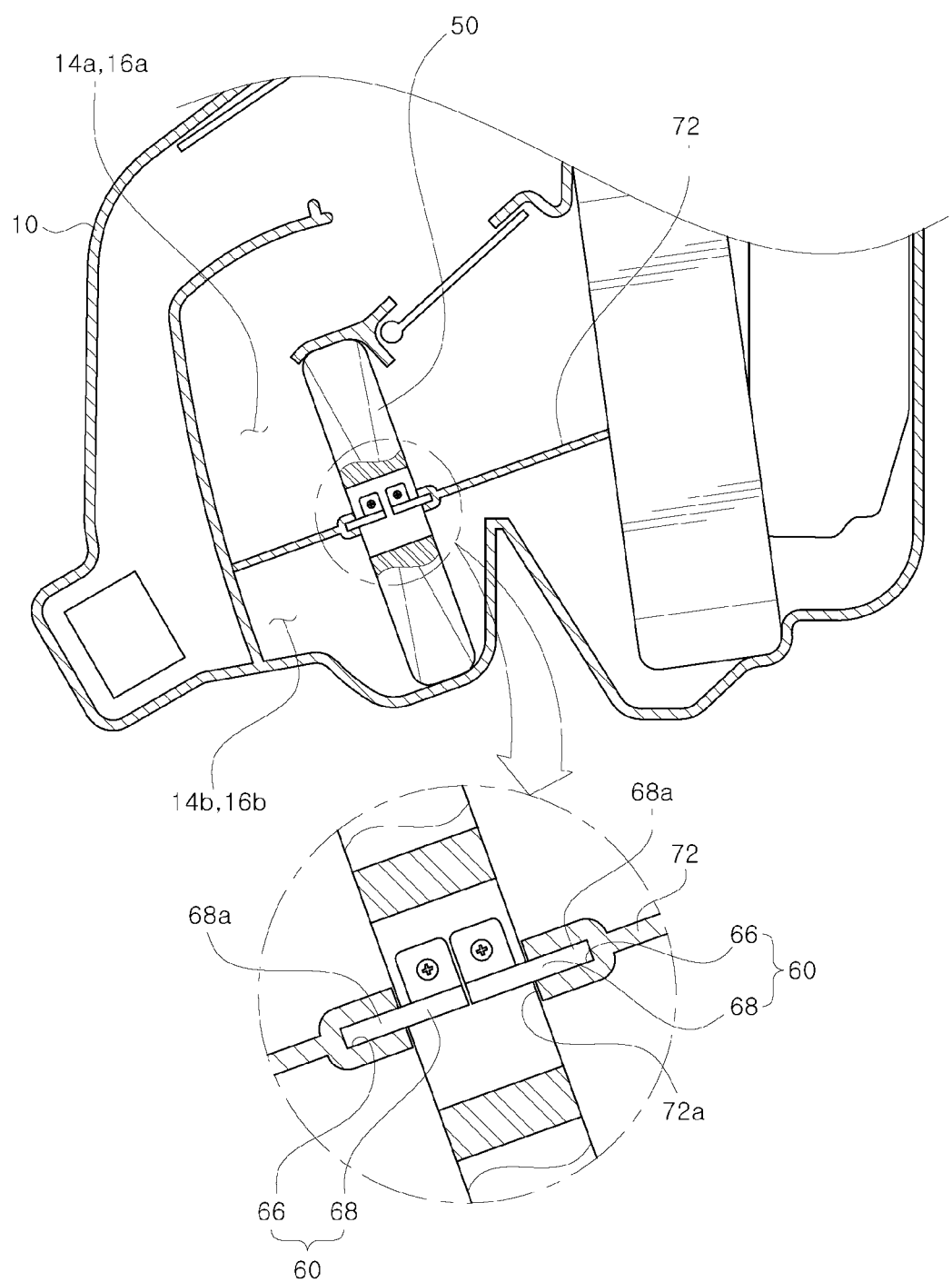
FIG. 11 is a cross-sectional side view showing the configuration of a vehicular air conditioning system according to a further embodiment of the present invention, in which view a heat exchanger is assembled into an air conditioning case.

FIGS. 9 to 11 are views showing a vehicular air conditioning system according to another embodiment of the present invention.

The vehicular air conditioning system according to another embodiment includes a coupling part 60 that airtightly couples the PTC heater 50 and the separation plate 12. The coupling part 60 is configured to be used for a four zone type air conditioning system.

The four zone type air conditioning system includes not only a transverse separation plate 70 that divides the inside of the air conditioning case 10 into left and right parts, but also a vertical separation plate 72 that divides the inside of the air conditioning case 10 into upper and lower parts.

The vertical separation plate 72 divides the inside of the air conditioning case 10 into upper and lower parts, and cooperates with the transverse separation plate 70 to partition the inside of the air conditioning case 10 into a left upper flow path 14a, a left lower flow path 14b, a right upper flow path 16a, and a right lower flow path 16b.

Therefore, the left upper and lower flow paths 14a and 14b and the right upper and lower flow paths 16a and 16b can supply a cold air and a hot air to a total of four zones, i.e., left upper and lower parts and right upper and lower parts of the vehicle interior. This allows the four zones in the vehicle interior to be independently cooled and heated.

In this regard, the vertical separation plate 72 has a cutout 72a formed at a portion corresponding to the PTC heater 50.

The cutout 72a is cut along the assembly direction of the PTC heater 50 from the side opening 10a of the air conditioning case 10.

The cutout 72a thus cut is configured to accommodate the PTC heater 50 assembled through the side opening 10a of the air conditioning case 10.

Accordingly, the PTC heater 50 is also divided into upper and lower parts corresponding to the upper and lower parts of the air conditioning case 10.

Meanwhile, the coupling part 60 has a structure for airtightly coupling the vertical separation plate 72 and the PTC heater 50. In particular, the coupling part 60 is configured to airtightly couple the cutout 72a of the vertical separation plate 72 and the PTC heater 50.

To this end, the coupling part 60 includes grooves 66 formed on both sides of the cutout 72a of the vertical separation plate 72, and tongue members 68 installed on the PTC heater 50 so as to correspond to the grooves 66.

The grooves 66 are formed along both sides of the cutout 72a of the vertical separation plate 72. In particular, the grooves 66 are formed along the portions of both sides of the cutout 72a corresponding to the PTC heater 50.

The grooves 66 thus formed are configured to correspond to both sides of the PTC heater 50 assembled through the side opening 10a of the air conditioning case 10.

In this regard, the grooves 66 are configured to be integrally formed during the injection molding of the vertical separation plate 72.

The tongue members 68 are manufactured separately and then mounted on the outer surface of the PTC heater 50.

In particular, the tongue members 68 are configured to be mounted on the outer surface of the PTC heater 50 corresponding to the cutout 72a of the vertical separation plate 72. The tongue member 68 is configured to be aligned with the cutout 72a of the vertical separation plate 72 when assembled into the air conditioning case 10 through the side opening 10a of the air conditioning case 10 together with the PTC heater 50.

Meanwhile, the tongue member 68 has tongues 68a protruding toward both sides of the cutout 72a of the vertical separation plate 72.

The tongues 68a are formed to correspond to the grooves 66 formed on both sides of the cutout 72a of the vertical separation plate 72 72. In particular, the tongues 68a are formed to correspond to the grooves 66 and to extend along the assembly direction of the PTC heater 50.

As shown in FIGS. 10 and 11, when the PTC heater 50 is assembled into the air conditioning case 10, the tongues 68a are configured to be fitted and coupled to the grooves 66 of both sides of the cutout 72a of the vertical separation plate 72.

Therefore, the tongues 68a are configured to hermetically seal the gap between the PTC heater 50 and the cutout 72a of the vertical separation plate 72.

In particular, since the tongues 68a are fitted and coupled to the grooves 66, the airtight performance thereof is very excellent. As a result, air communication between the upper and lower flow paths through the cutout 72a of the vertical separation plate 72 is fundamentally prevented.

According to the vehicular air conditioning system of another embodiment having such a configuration, it is possible to efficiently seal the gap between the transverse separation plate 70 and the PTC heater 50 as well as the gap between the vertical separation plate 72 and the PTC heater 50. Therefore, air communication between the respective flow paths 14a, 14b, 16a and 16b in the four-zone air conditioning case 10 can be fundamentally prevented.

In particular, the gap between the PTC heater 50 and the separation plates 70 and 72 can be efficiently sealed without worrying about deformation, thermal damage, and assembly failure. This makes it possible to fundamentally prevent air communication between the four flow paths 14a, 14b, 16a and 16b in the air conditioning case 10.

While the preferred embodiments of the present invention have been described above, the present invention is not limited to the above-described embodiments. Various modifications and changes may be made without departing from the scope and spirit of the present invention defined in the claims.

DESCRIPTION OF REFERENCE NUMERALS

10: air conditioning case, 10a: side opening, 12: separation plate, 12a: through-hole, 14: left flow path, 14a: left upper flow path, 14b: left lower flow path, 16: right flow path, 16a: right upper flow path, 16b: right lower flow path, 20, 30: temperature door, 40: cooling-purpose heat exchanger, 50: heating-purpose heat exchanger, 60: coupling part, 62: groove, 64: tongue member, 64a: tongue, 66: groove, 68: tongue member, 68a: tongue, 70: transverse separation plate, 72: vertical separation plate

What is claimed is:

1. A vehicular air conditioning system, comprising:
    an air conditioning case;
    a heat exchanger installed inside the air conditioning case;
    a separation plate configured to divide the inside of the air conditioning case into a plurality of flow paths and partition the heat exchanger into parts corresponding to the divided flow paths; and
    a coupling part configured to airtightly combine the separation plate and the heat exchanger to prevent air communication between the flow paths through a gap between the separation plate and the heat exchanger.

2. The system of claim 1, wherein the coupling part includes a groove formed on one side of the separation plate and the heat exchanger, and a tongue member installed on the other side of the separation plate and the heat exchanger and coupled to the groove, and
    the groove and the tongue member are coupled to each other to airtightly seal a gap between the separation plate and the heat exchanger.

3. The system of claim 2, wherein the heat exchanger is assembled into the air conditioning case by being inserted through a side opening of the air conditioning case and then pushed and slid toward the inside of the air conditioning case, and the groove and the tongue member of the coupling part are formed along an assembly direction of the heat exchanger and coupled to each other in a process of assembling the heat exchanger into the air conditioning case.

4. The system of claim 3, wherein the separation plate includes a transverse separation plate configured to divide the inside of the air conditioning case into a left flow path and a right flow path and partition the heat exchanger into a left part and a right part to correspond to the left flow path and the right flow path, and the coupling part is configured to prevent air communication between the left flow path and the right flow path through the gap between the transverse separation plate and the heat exchanger.

5. The system of claim 4, wherein the transverse separation plate has a through-hole extending from the side opening of the air conditioning case toward the assembly direction of the heat exchanger, the heat exchanger is inserted into the side opening of the air conditioning case and then assembled into the left flow path and the right flow path through the through-hole of the transverse separation plate, and the coupling part is configured to airtightly couple the through-hole of the transverse separation plate and the heat exchanger to prevent air communication between the left flow path and the right flow path through a gap between the through-hole and the heat exchanger.

6. The system of claim 5, wherein the coupling part includes a groove formed around the through-hole of the transverse separation plate on the side of the side opening, and a tongue member mounted on the heat exchanger to correspond to the groove of the transverse separation plate, and the groove and the tongue member are coupled to each other in a process of assembling the heat exchanger into the air conditioning case through the side opening and configured to airtightly seal the gap between the through-hole of the transverse separation plate and the heat exchanger.

7. The system of claim 6, wherein the tongue member includes a pair of tongue members mounted on an outer surface of the heat exchanger corresponding to the groove of the transverse separation plate and arranged on both sides of the heat exchanger to face each other with the heat exchanger interposed therebetween.

8. The system of claim 7, wherein the separation plate includes a vertical separation plate configured to divide the inside of the air conditioning case into an upper flow path and a lower flow path and partition the heat exchanger into an upper part and a lower part corresponding to the upper flow path and the lower flow path, and the coupling part is configured to prevent air communication between the upper flow path and the lower flow path through a gap between the vertical separation plate and the heat exchanger.

9. The system of claim 7, wherein the vertical separation plate has a cutout cut from the side opening of the air conditioning case along the assembly direction of the heat exchanger, the heat exchanger is inserted into the side opening of the air conditioning case and then assembled toward the upper flow path and the lower flow path through the cutout of the vertical separation plate, and the coupling part is configured to airtightly couple the cutout of the vertical separation plate and the heat exchanger to prevent air communication between the upper flow path and the lower flow path through a gap between the cutout and the heat exchanger.

10. The system of claim 9, wherein the coupling part includes grooves formed along both sides of the cutout of the vertical separation plate on the side of the side opening, and tongue members mounted on the heat exchanger so as to correspond to the grooves of the vertical separation plate, and the grooves and the tongue members are coupled to each other in a process of assembling the heat exchanger into the air conditioning case through the side opening and configured to airtightly seal the gap between the cutout of the vertical separation plate and the heat exchanger.

11. The system of claim 1, wherein the coupling part is configured to airtightly couple the separation plate and the heat exchanger to prevent air communication between the flow paths in the air conditioning case through the gap between the separation plate and the heat exchanger.

12. The system of claim 11, wherein the heat exchanger is a PTC heater.

* * * * *